United States Patent
Beattie, Jr. et al.

(10) Patent No.: US 10,284,341 B2
(45) Date of Patent: *May 7, 2019

(54) SYSTEM AND METHOD TO REQUEST A PORTION OF A MEDIA CONTENT ITEM

(71) Applicant: AT&T INTELLECTUAL PROPERTY I, L.P., Atlanta, GA (US)

(72) Inventors: James Gordon Beattie, Jr., Bergenfield, NJ (US); Arvind R. Mallya, Walnut Creek, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,912

(22) Filed: Nov. 7, 2017

(65) Prior Publication Data

US 2018/0062794 A1     Mar. 1, 2018

Related U.S. Application Data

(63) Continuation of application No. 14/969,849, filed on Dec. 15, 2015, now Pat. No. 9,847,852.

(51) Int. Cl.
   *H04L 1/00*           (2006.01)
   *G06F 11/00*         (2006.01)
   (Continued)

(52) U.S. Cl.
   CPC ........... *H04L 1/08* (2013.01); *H04B 7/18502* (2013.01); *H04L 65/4084* (2013.01); *H04L 65/4092* (2013.01); *H04L 65/60* (2013.01)

(58) Field of Classification Search
   CPC ....... H04L 1/08; H04L 65/60; H04L 29/2601; H04L 27/2601; H04L 65/4084;
   (Continued)

(56) References Cited

U.S. PATENT DOCUMENTS 5,592,491 A     1/1997   Dinkins
8,245,264 B2    8/2012   Toebes et al.
(Continued)

FOREIGN PATENT DOCUMENTS

WO     2013160042 A1    10/2013

OTHER PUBLICATIONS

Nguyen, T., et al., "Distributed Video Streaming with Forward Error Correction," Packet Video Workshop. vol. 2002, http :www-video.eecs.berkeley.edu *{thinhq, avz}@eecs.berkeley.edu, 12 pp.

*Primary Examiner* — Christine T. Tu
(74) *Attorney, Agent, or Firm* — Toler Law Group, PC

(57) ABSTRACT

A method includes concurrently receiving, at a first communication interface of a media device, a first media content stream and a second media content stream. The method includes sending, from the media device to an output device, decoded first media content processed from the first media content stream. The method includes storing decoded second media content processed from the second media content stream in a buffer. The method includes detecting an error associated with a portion of the second media content stream during receipt of the first media content stream and the second media content stream. The method also includes sending, from a second communication interface of the media device to a media content source, a request for the portion. The second communication interface is distinct from the first communication interface.

20 Claims, 6 Drawing Sheets

(51) Int. Cl.
*H04L 1/08* (2006.01)
*H04B 7/185* (2006.01)
*H04L 29/06* (2006.01)

(58) Field of Classification Search
CPC ............ H04L 65/4092; H04B 7/18502; H04N 19/00533; H04N 21/44209; H04N 21/44004
USPC ....... 714/746, 4.1, 47.1, 48, 57; 375/240.27, 375/240.28, 224, 227
See application file for complete search history.

(56) References Cited

U.S. PATENT DOCUMENTS

| | | |
|---|---|---|
| 8,418,217 B2 * | 4/2013 | Stallings ............... H04N 5/76 |
| | | 725/114 |
| 8,752,102 B2 | 6/2014 | Menn et al. |
| 8,774,286 B2 | 7/2014 | Yokokawa et al. |
| 8,789,096 B2 * | 7/2014 | Bly, Jr. ............ H04N 21/4331 |
| | | 725/101 |
| 8,806,551 B2 | 8/2014 | Haimi-Cohen |
| 9,077,991 B2 | 7/2015 | Perlman et al. |
| 9,154,824 B2 | 10/2015 | Wiser et al. |
| 9,178,693 B2 | 11/2015 | Ficco |
| 2008/0144820 A1 | 6/2008 | Hong |
| 2009/0183218 A1 | 7/2009 | Li et al. |
| 2009/0196217 A1 | 8/2009 | Himmanen et al. |
| 2010/0121936 A1 * | 5/2010 | Liu ................... H04N 5/44543 |
| | | 709/217 |
| 2010/0189122 A1 | 7/2010 | Dandekar et al. |
| 2014/0337473 A1 | 11/2014 | Frusina et al. |
| 2015/0237398 A1 | 8/2015 | Wang et al. |
| 2015/0312599 A1 | 10/2015 | Brockmann et al. |

\* cited by examiner

SYSTEM AND METHOD TO REQUEST A PORTION OF A MEDIA CONTENT ITEM

PRIORITY CLAIM

This application is a continuation of, and claims priority to, U.S. patent application Ser. No. 14/969,849, filed Dec. 15, 2015, now U.S. Pat. No. 9,847,852, which is hereby incorporated by reference in its entirety.

FIELD OF THE DISCLOSURE

The present disclosure is generally related to media devices and more particularly to requesting one or more portions of a media content item by a media device.

BACKGROUND

Electronic devices may use networks to communicate media content. An example of a network is a satellite network. In a satellite network, a satellite may distribute content to multiple media devices.

Information transmitted to a media device using a satellite network may be subject to errors caused by noise, interference, and other conditions. For example, rain and other environmental conditions may cause errors in information transmitted using a satellite network.

To reduce data loss resulting from such conditions, information sent using a satellite network may be encoded (e.g., to add "redundant" information, such as parity information). The redundant information may enable correction of errors in some cases (e.g., where a number of errors is relatively small). In other cases, the redundant information may be insufficient to enable correction of errors (e.g., where a number of errors is relatively large), which may result in data loss.

Data loss may degrade user experience in connection with displaying content received via a satellite network. For example, a user may perceive certain "artifacts" or "missing" frames of a content item, such as a television program. In some cases, loss of service may result (e.g., one or more television channels may be "missing" during rain or other conditions).

DETAILED DESCRIPTION

Figure 1:
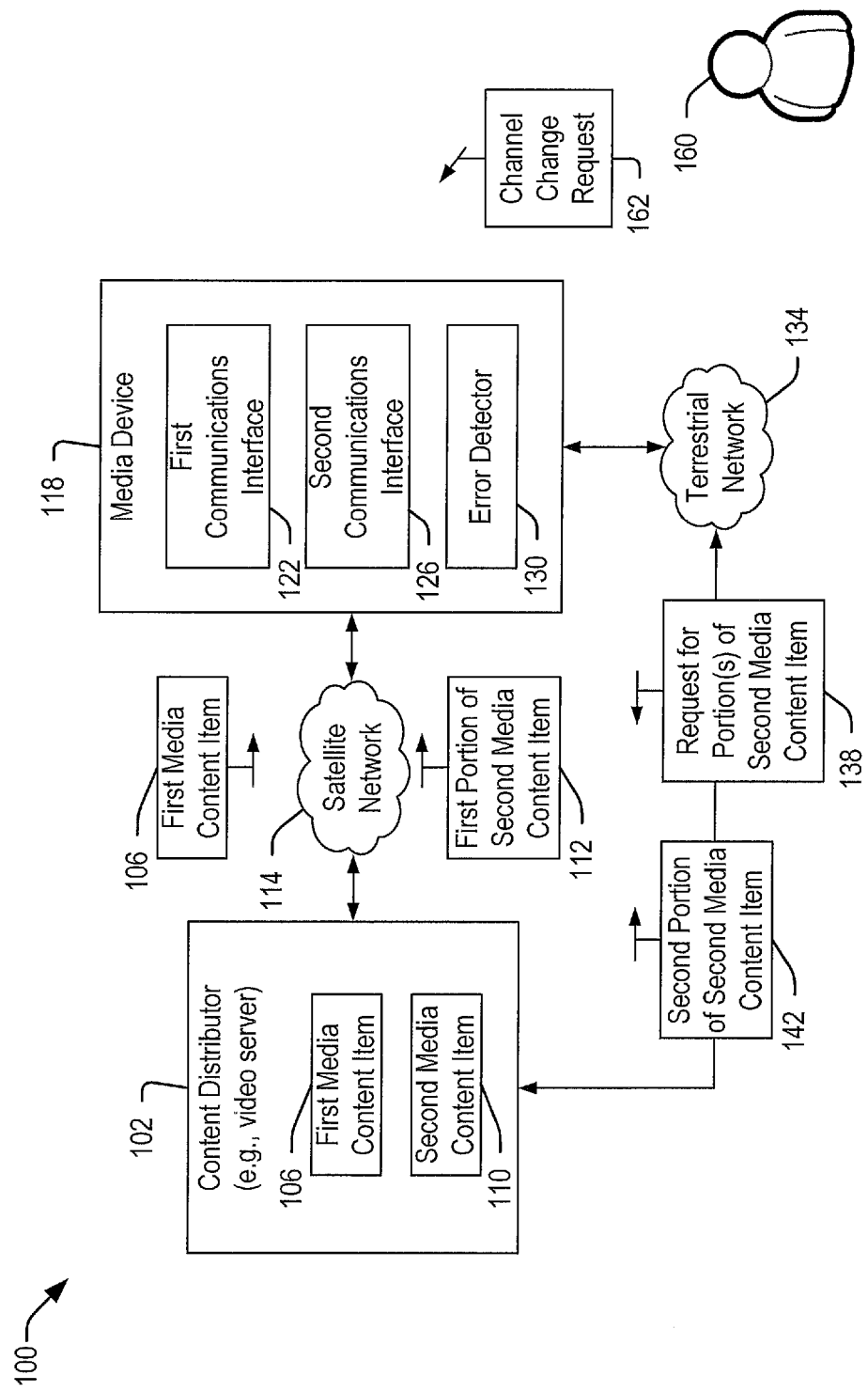
FIG. 1 is a block diagram illustrating a particular example of a system.

A media device in accordance with the disclosure may use a terrestrial network to request one or more portions of a media content item that is received via a satellite network. For example, the media device may "fill in" one or more packets of the media content item by requesting the one or more packets using the terrestrial network in response to detecting an error associated with the one or more packets. In an illustrative example, the media device may receive a first media content item and a second media content item using the satellite network, and the media device may "fill in" one or more packets of the second media content item while the first media content item is output from the media device (e.g., to a display device, to one or more speakers, or a combination thereof). In this example, the second media content item may be available in case a request for the second media content item is received at the media device (e.g., in connection with a channel change request), which may reduce or eliminate perception of a delay (or a "lag") by a user of the media device.

In a particular example, a method includes receiving a first media content item at a media device via a first communications interface. The method also includes receiving, while outputting the first media content item from the media device, at least a first portion of a second media content item at the media device via the first communications interface. The second portion of the second media content item is different than the first portion of the second media content item. The method further includes detecting an error associated with a second portion of the second media content item and sending a request for the second portion of the second media content item via a second communications interface of the media device.

In another particular example, an apparatus includes a first communications interface configured to receive a first media content item and at least a first portion of a second media content item during receipt of the first media content item at a media device. The apparatus also includes an error detector configured to detect an error associated with a second portion of the second media content item while the first media content item is output from the media device. The apparatus further includes a second communications interface configured to send a request for the second portion of the second media content item.

In another particular example, a computer-readable storage device includes instructions executable by a processor to perform operations. The operations include receiving a first media content item at a media device via a first communications interface. The operations also include, while outputting the first media content item from the media device, receiving at least a first portion of a second media content item at the media device via the first communications interface and detecting an error associated with a second portion of the second media content item. The operations further include sending, while outputting the first media content item from the media device, a request to a server for the second portion of the second media content item via a second communications interface of the media device.

Referring to FIG. 1, a particular embodiment of a system is depicted and generally designated 100. The system 100 may include a network device, such as a content distributor 102. The system 100 may also include a media device 118.

In an illustrative example, the content distributor 102 includes a video server. Depending on the particular example, the content distributor 102 may include a satellite device (e.g., a satellite transmitter), another device (e.g., a server, such as a video server) that is in communication with the satellite device, or both.

In an illustrative example, the media device 118 includes a set-top box (STB). Alternatively or in addition, the media device 118 may include a customer premises equipment (CPE) device, a television, a monitor, a camera, a microphone, a mobile device (e.g., a cellular telephone), a gaming system, a computer (e.g., a laptop computer, a desktop computer, or a tablet computer), another electronic device, or a combination thereof, as illustrative examples. In an illustrative implementation, the media device 118 includes an STB and a display (e.g., a television or a monitor).

The content distributor 102 and the media device 118 may be configured to communicate using a first network, such as a satellite network 114. In the example of FIG. 1, the content distributor 102 and the media device 118 are also configured to communicate using a second network, such as a terrestrial network 134. The terrestrial network 134 may include an Internet Protocol (IP) network (e.g., the Internet, an Ethernet network, or both).

During operation, the media device 118 may receive media content from the content distributor 102 via the satellite network 114. For example, the media device 118 may receive a first media content item 106 from the content distributor 102 via the satellite network 114. In an illustrative example, the first media content item 106 may include content requested by a user 160 of the media device 118. For example, the user 160 may request the first media content item 106 by indicating a channel (e.g., a television station) or an address (e.g., a uniform resource locator (URL)) at the media device 118. The first media content item 106 may include television content, a movie, an image, a video, audio, or a combination thereof, as illustrative examples.

After receiving the first media content item 106, the media device 118 may output the first media content item 106. For example, the media device 118 may output the first media content item 106 to a display that is included in or that is coupled to the media device 118. Alternatively or in addition, the media device 118 may output the first media content item 106 to one or more speakers that are included in or that are coupled to the media device 118. The media device 118 may output the first media content item 106 in response to input from the user 160 (e.g., in response to a channel request initiated by the user 160 using a remote control device or another device).

The media device 118 may receive at least a first portion 112 (e.g., one or more frames or one or more packets, such as one or more Moving Picture Experts Group (MPEG) packets, as illustrative examples) of a second media content item 110 while outputting the first media content item 106 from the media device 118. To illustrate, the media device 118 may receive the first portion 112 of the second media content item 110 "in the background" while outputting the first media content item 106 from the media device 118. In some cases, one or more portions of the second media content item 110 may include one or more errors (e.g., due to rain or other weather conditions that may affect operation of the satellite network 114). In this case, one or more portions of the second media content 110 may be unavailable (or "missing"), or the media device 118 may be unable to decode one or more portions of the second media content item 110.

In some implementations, the media device 118 is configured to select a channel or an address associated with the second media content item 110 in response to determining that the channel or the address is indicated as being a "favorite" of the user 160. For example, the media device 118 may be configured to store a list of frequently accessed channels, a list of frequently accessed addresses, or both, such as by monitoring which channels and addresses are requested by the user 160. In this example, the media device 118 may be configured to select (e.g., during receipt of the first media content item 106) a channel or address associated with the second media content item 110 (e.g., by tuning to the channel or by sending a request to the address) in response to the channel or address being indicated as a "favorite" of the user 160 (e.g., in response to the channel or address being indicated as frequently accessed).

The media device 118 may receive the first media content item 106 and the first portion 112 of the second media content item 110 using a first communications interface 122 (e.g., a satellite interface). The first communications interface 122 may include or may be coupled to a satellite receiver, a satellite antenna (e.g., a satellite "dish"), or both. The first communications interface 122 is configured to communicate with (e.g., to receive content items from) the content distributor 102 using the satellite network 114. Depending on the particular implementation, the first media content item 106 and the first portion 112 of the second media content item 110 may be received by the media device 118 using the first communications interface 122 in connection with a time division multiple access (TDMA) technique, a frequency division multiple access (FDMA) technique, a code division multiple access (CDMA) technique, another technique, or a combination thereof.

In some circumstances, one or more portions of a content item may be unavailable (e.g., may be "lost" by the media device 118), or the media device 118 may be unable to decode one or more portions of a content item (e.g., the one or more portions may be "corrupted" prior to or after being received at the media device 118). The media device 118 is configured to detect an error associated with a portion of a content item (e.g., by determining that the portion is unavailable or that the portion cannot be decoded). For example, the media device 118 may include an error detector 130 configured to detect an error associated with a second portion 142 (e.g., one or more frames or one or more packets, such as one or more Moving Picture Experts Group (MPEG) packets, as illustrative examples) of the second media content item 110. Depending on the particular implementation, the error detector 130 may include hardware (e.g., a decoder device or a processor device), processor-executable instructions stored at a memory, or both.

The error detector 130 may be configured to detect the error by determining that the second portion 142 is unavailable or that the second portion 142 cannot be decoded. For example, the error detector 130 may be configured to detect that the second portion 142 is "missing" from a memory (e.g., a buffer) that stores portions of one or more content items at the media device 118. As another example, the error detector 130 may be configured to detect a decoding error associated with the second portion 142. An example of a decoding error is a forward error correction (FEC) error that exceeds an error correction capability associated with an error correction coding (ECC) technique used to encode the second portion 142.

In response to detecting an error associated with the second portion 142, the media device 118 may send a request 138 for the second portion 142 of the second media content item 110 using the terrestrial network 134. In an illustrative example, the request 138 corresponds to an MPEG retry request associated with an MPEG audio protocol or an MPEG video protocol. In other examples, the request 138 may correspond to another message.

The media device 118 may send the request 138 using a second communications interface 126 (e.g., a wired IP communications interface or a wireless IP communications interface) that is configured to communicate using the terrestrial network 134 (e.g., by sending and receiving IP packets using the terrestrial network 134). The second communications interface 126 may include or may be coupled to a modem (e.g., a wired modem or a wireless modem), such as an IP modem that is in communication with the terrestrial network 134.

The request 138 may identify the second portion 142 of the second media content item 110. As an illustrative example, the request 138 may indicate a timestamp associated with the second portion 142 of the second media content item 110.

The content distributor 102 may receive the request 138 via the terrestrial network 134. The content distributor 102 may send the second portion 142 to the media device 118 using the terrestrial network 134 in response to the request 138.

Upon receiving the second portion 142 from the content distributor 102, the media device 118 may combine the second portion 142 with one or more other portions of the second media content item 110. For example, the media device 118 may insert the second portion 142 at a buffer that stores portions of the second media content item 110. In an illustrative implementation, portions of the second media content item 110 are time-synchronized (e.g., are ordered based on timestamps). The media device 118 may insert the second portion 142 at a location of the buffer based on the timestamp indicated by the second portion 142.

In some cases, the media device 118 may receive a request from the user 160 to output the second media content item 110. For example, the media device 118 may receive a channel change request 162 from the user 160 indicating a channel associated with the second media content item 110. In this case, the media device 118 may output the second media content item 110 (e.g., instead of the first media content item 106). For example, the media device 118 may output the second media content item 110 (e.g., instead of the first media content item 106) from a buffer of the media device 118 to a display that is included in or that is coupled to the media device 118. Alternatively or in addition, the media device 118 may output the second media content item 110 (e.g., instead of the first media content item 106) from the buffer to one or more speakers that are included in or that are coupled to the media device 118. The second media content item 110 may include the second portion 142 (or an error corrected version of the second portion 142) that is received by the media device 118 using the terrestrial network 134.

In an illustrative implementation, the first media content item 106 and the second media content item 110 are output at a first rate that is less than a second rate at which the first media content item and the second media content item are received via the first communications interface 122. The first rate may compensate for delays associated with packet loss associated with the satellite network 114. The first rate may be based on a communications speed associated with the second communications interface 126. For example, the first rate may be selected to enable request and retrieval of the second portion 142 so that the second portion 142 is available at the media device 118 prior to the second portion 142 being output from the media device 118 (e.g., so that the user 160 does not perceive a "delay" or a "lag" associated with the second media content item 110 while the second portion 142 is requested and received by the media device 118). In an illustrative example, the media device 118 is configured to select the first rate (or to "throttle" the first rate) based on a characteristic associated with the terrestrial network 134 (e.g., based on a bitrate associated with the terrestrial network 134, based on a bandwidth associated with the terrestrial network 134, or both).

In some implementations, information may be generated based on requests for portions of content items (e.g., based on the request 138) regarding loss of service. For example, the information may indicate portions of a media content item that are lost (and re-requested) as a result of weather or other conditions. Alternatively or in addition, the information may indicate an amount of time that a customer is without service (e.g., based on a number of portions re-requested), one or more remedial measures taken to supply service (e.g., retransmission), or both.

One or more aspects described with reference to FIG. 1 may improve performance of the media device 118 in connection with reception of content using the satellite network 114. For example, by requesting the second portion 142 of the second media content item 110 from the content distributor 102, the second media content item 110 may be buffered at the media device 118 when a request for the second media content item 110 (e.g., the channel change request 162) is received at the media device 118, which may reduce or avoid delay associated with requesting one or more portions of the second media content item 110 after the request is received.

Although certain examples are described with reference to two media content items (the first media content item 106 and the second media content item 110), it should be appreciated that the disclosure is applicable to more than two media content items. For example, while the first media content item 106 is output from the media device 118, multiple content items may be "filled" by the media device 118. The multiple content items may correspond to a group of favorite channels of the user 160 (e.g., frequently accessed channels by the user 160).

Figure 2:
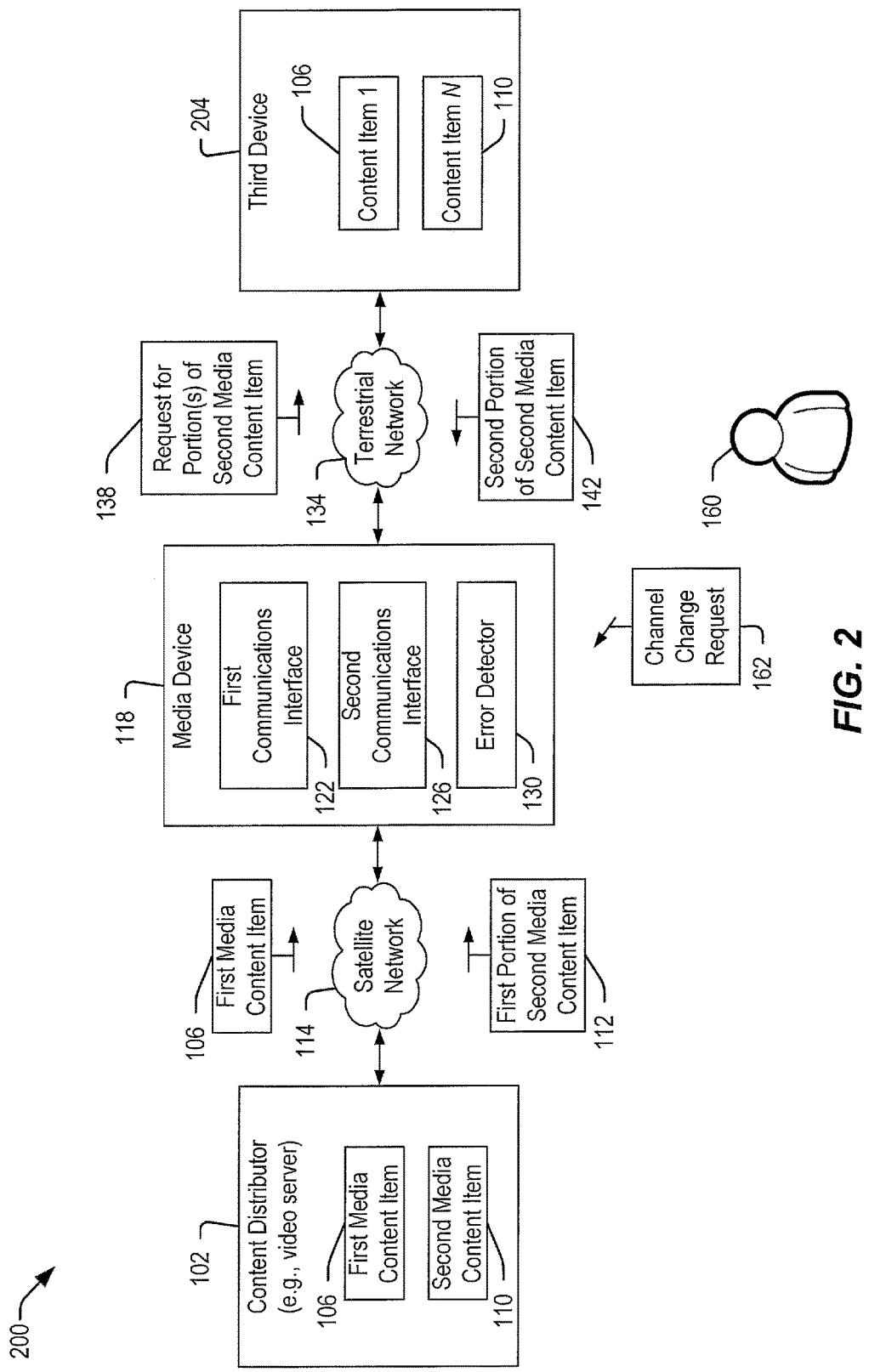
FIG. 2 is a block diagram illustrating another particular example of a system.

Referring to FIG. 2, another particular illustrative example of a system is depicted and generally designated 200. The system 200 of FIG. 2 includes the content distributor 102, the satellite network 114, the media device 118, and the terrestrial network 134.

The system 200 further includes a third device 204. The third device 204 is coupled to the media device 118 via the terrestrial network 134. Depending on the particular implementation, the third device 204 may include a content distributor, a server (e.g., a video server), a media device, another device, or a combination thereof. The third device 204 may include one or more hub servers, such as a regional hub server, a national hub server, or both.

During operation, the media device 118 may request one or more portions of one or more media content items received via the satellite network 114. For example, the media device 118 may send the request 138 for the second portion 142 of the second media content item 110, as described with reference to FIG. 1.

In the example of FIG. 2, the media device 118 may send the request 138 to the third device 204 via the terrestrial network 134 in response to detecting an error (e.g., an error associated with the second portion 142 of the second media content item 110). The third device 204 may store one or more media content items, such as the first media content item 106 and the second media content item 110.

To illustrate, the third device 204 may correspond to a content distributor that distributes content using the terrestrial network 134. In this case, the media device 118 may store a list of one or more content distributors, and the media device 118 may send the request 138 to the third device 204 in response to detecting the error associated with the second portion 142 and in response to accessing the list.

In another example, the third device 204 corresponds to another media device. For example, the third device 204 may include a second media device that is co-located (e.g., located in the same building or in the same residence) with respect to the media device 118. In this example, the third device 204 may receive one or more of the first media content item 106 and the second media content item 110 from a content distributor (e.g., the content distributor 102) using the satellite network 114 or using the terrestrial network 134.

The third device 204 may send the second portion 142 of the second media content item 110 to the media device 118 in response to the request 138. Upon receiving the second portion 142 from the third device 204, the media device 118 may combine the second portion 142 with one or more other portions of the second media content item 110, as described with reference to FIG. 1. In some cases, the media device 118 may receive a request from the user 160 to output the second media content item 110. For example, the media device 118 may receive a channel change request from the user 160 (e.g., the channel change request 162) indicating a channel associated with the second media content item 110. In this case, the media device 118 may output the second media content item 110 (e.g., instead of the first media content item 106).

One or more aspects described with reference to FIG. 2 may improve performance of the media device 118 in connection with reception of content using the satellite network 114. For example, by requesting the second portion 142 of the second media content item 110 from the third device 204, the second media content item 110 may be buffered at the media device 118 when a request for the second media content item 110 (e.g., the channel change request 162) is received at the media device 118, which may reduce or avoid delay associated with requesting one or more portions of the second media content item 110 after the request is received.

Figure 3:
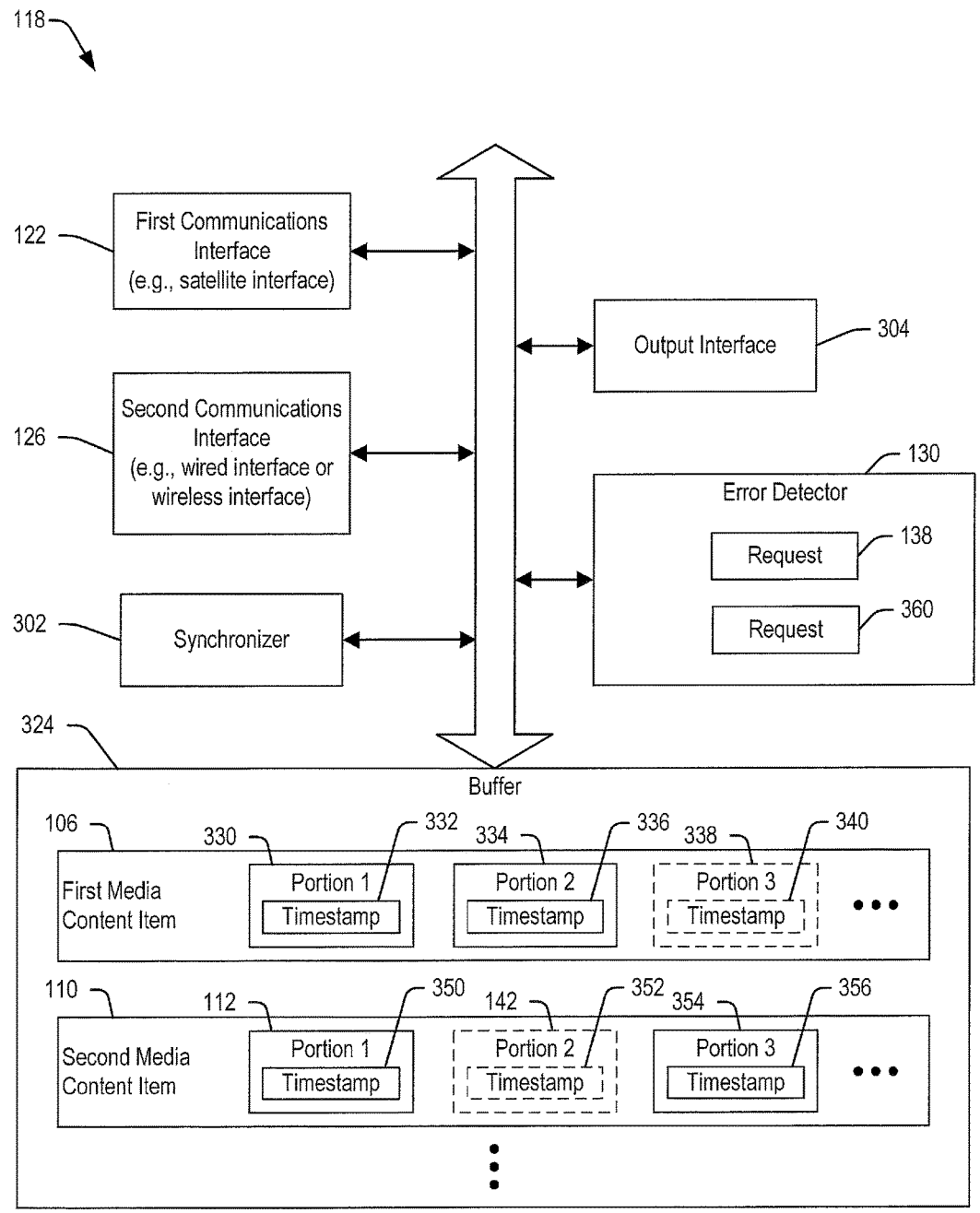
FIG. 3 is a block diagram illustrating a particular example of a media device that may be included in the system of FIG. 1, the system of FIG. 2, or both.

FIG. 3 illustrates a particular illustrative example of the media device 118. In the example of FIG. 3, the media device 118 includes the first communications interface 122, the second communications interface 126, and the error detector 130 of FIGS. 1 and 2. The media device 118 may also include a synchronizer 302, an output interface 304 (e.g., a video interface to a display, an audio interface to one or more speakers, or a combination thereof), and a buffer 324 (e.g., a packet buffer, such as an MPEG packet buffer).

During operation, the media device 118 may receive media content items using the first communications interface 122. For example, the media device 118 may receive portions of the first media content item 106 and the second media content item 110 from the content distributor 102 of FIGS. 1 and 2 using the first communications interface 122.

The media device 118 may store portions of the first media content item 106 and the second media content item 110 at the buffer 324. For example, the buffer 324 may store a first portion 330 of the first media content item 106 and a second portion 334 of the first media content item 106. As additional examples, the buffer 324 may store the first portion 112 of the second media content item 110 and a third portion 354 of the second media content item 110.

Portions of the first media content item 106 and the second media content item 110 may include identification information. For example, each portion of the first media content item 106 may include a timestamp that indicates an order of portions of the first media content item 106. To further illustrate, the first portion 330 of the first media content item 106 may include a timestamp 332, and the second portion 334 of the first media content item 106 may include a timestamp 336. As additional examples, the first portion 112 of the second media content item 110 may include a timestamp 350, and the third portion 354 of the second media content item 110 may include a timestamp 356.

The error detector 130 may be configured to detect an error associated with the second portion 142 of the second media content item 110. For example, in some cases, the second portion 142 may be "missing" from the buffer 324 (e.g., due to packet loss or interference associated with the satellite network 114). In this case, the error detector 130 may determine that an identification of the second portion 142 (e.g., a timestamp 352 included in the second portion 142) is missing from the buffer 324. Alternatively or in addition, the error detector 130 may be configured to detect a decoding error associated with the second portion 142 during a decoding process associated with the second media content item 110. In an illustrative example, the error detector 130 detects the error while the first media content item 106 is output via the output interface 304 (e.g., to a display that is included in or that is coupled to the media device 118, to one or more speakers that are included in or that are coupled to the media device 118, or a combination thereof).

In response to detecting an error associated with the second portion 142 of the second media content item 110, the media device 118 may send the request 138 for the second portion 142 of the second media content item 110 via the terrestrial network 134 of FIGS. 1 and 2. For example, the media device 118 may send the request 138 to the content distributor 102, as described with reference to FIG. 1. As another example, the media device 118 may send the request 138 to the third device 204, as described with reference to FIG. 2.

In response to sending the request 138, the media device 118 may receive the second portion 142 of the second media content item 110 via the terrestrial network 134 of FIGS. 1 and 2. For example, the media device 118 may receive the second portion 142 of the second media content item 110 from the content distributor 102, as described with reference to FIG. 1. As another example, the media device 118 may receive the second portion 142 of the second media content item 110 from the third device 204, as described with reference to FIG. 2.

The synchronizer 302 may be configured to insert the second portion 142 of the second media content item 110 at a particular location of the buffer 324. For example, the synchronizer 302 may be configured to insert the second portion 142 of the second media content item 110 at a location of the buffer 324 based on the timestamp 352, such as by inserting the second portion 142 "between" the first portion 112 and the third portion 354 based on the timestamp 350, the timestamp 352, and the timestamp 356 (e.g., so that the portions 112, 142, and 354 are arranged in a chronology indicated by the timestamps 350, 352, and 356). In an illustrative example, the synchronizer 302 inserts the second portion 142 of the second media content item 110 at a location of the buffer 324 while the first media content item 106 is output via the output interface 304 (e.g., to a display that is included in or that is coupled to the media device 118, to one or more speakers that are included in or that are coupled to the media device 118, or a combination thereof).

In some cases, the error detector 130 may detect an error associated with a portion of the first media content item 106. To illustrate, the error detector 130 may detect an error associated with a third portion 338 of the first media content item 106, such as by determining that an identification of the third portion 338 (e.g., a timestamp 340 included in the third portion 338) is missing from the buffer 324. Alternatively or in addition, the error detector 130 may be configured to detect a decoding error associated with the third portion 338 during a decoding process associated with the first media content item 106. The error detector 130 may detect the error either while the first media content item 106 is output via the output interface 304 (e.g., while the first portion 330 is output via the output interface 304) or while the second media content item 110 is output via the output interface 304.

Upon detecting an error associated with the third portion 338 of the first media content item 106, the media device 118 may send a request 360 for the third portion 338 of the first media content item 106. The media device 118 may send the request 360 using the second communications interface 126 and the terrestrial network 134 of FIGS. 1 and 2. For example, the media device 118 may send the request 360 to the content distributor 102, as described with reference to FIG. 1. As another example, the media device 118 may send the request 360 to the third device 204, as described with reference to FIG. 2.

In response to sending the request 360, the media device 118 may receive the third portion 338 of the first media content item 106 via the terrestrial network 134 of FIGS. 1 and 2. For example, the media device 118 may receive the third portion 338 of the first media content item 106 from the content distributor 102, as described with reference to FIG. 1. As another example, the media device 118 may receive the third portion 338 of the first media content item 106 from the third device 204, as described with reference to FIG. 2.

The synchronizer 302 may be configured to insert the third portion 338 of the first media content item 106 at a particular location of the buffer 324. For example, the synchronizer 302 may be configured to insert the third portion 338 of the first media content item 106 at a location of the buffer 324 based on the timestamp 340, such as by inserting the third portion 338 after the second portion 334 based on the timestamps 336, 340 (e.g., so that the portions 330, 334, and 338 are arranged in a chronology indicated by the timestamps 332, 336, and 340).

In some cases, the media device 118 may provide content to another device, such as another media device. For example, if the media device 118 receives a request from another device (e.g., from the third device 204 of FIG. 2 via the terrestrial network 134) for a portion of a media content item (e.g., for the second portion 142, as an illustrative example), the media device 118 may send the portion to the other device (e.g., via the terrestrial network 134).

One or more aspects described with reference to FIG. 3 may improve performance of the media device 118 in connection with reception of content using the satellite network 114 of FIGS. 1 and 2. For example, by requesting the second portion 142 of the second media content item 110 using the second communications interface 126, the second media content item 110 may be stored at the buffer 324 when a request for the second media content item 110 (e.g., the channel change request 162) is received at the media device 118. As another example, by requesting the third portion 338 of the first media content item 106 using the second communications interface 126, the first media content item 106 may be stored at the buffer 324 when a request for the first media content item 106 (e.g., another channel change request) is received at the media device 118. As a result, user-perceivable delay associated with requesting one or more portions of a media content item may be reduced or avoided (e.g., by requesting a portion of a media content item "in the background" while another media content item is output from the media device 118).

Figure 4:
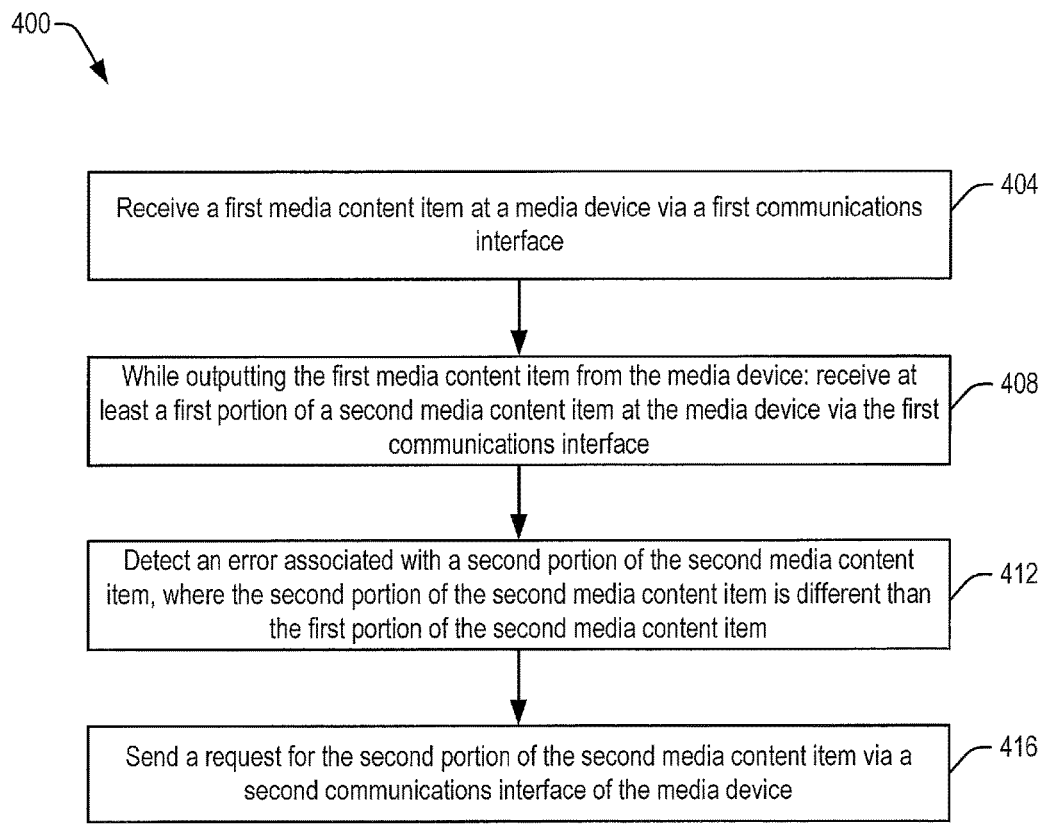
FIG. 4 is a flow diagram that illustrates a particular example of a method of operation of a media device, such as the media device of FIG. 3.

Referring to FIG. 4, a particular illustrative example of a method is depicted and generally designated 400. The method 400 may be performed at a media device, such as at the media device 118 of FIGS. 1-3.

The method 400 includes receiving a first media content item at the media device via a first communications interface, at 404. In an illustrative example, the first media content item corresponds to the first media content item 106, and the first communications interface corresponds to the first communications interface 122 (e.g., a satellite communications interface).

The method 400 further includes receiving, while outputting the first media content item from the media device, at least a first portion of a second media content item at the media device via the first communications interface, at 408. For example, the first portion 112 of the second media content item 110 may be received at the media device 118 while the first media content item 106 is output from the media device 118 (e.g., to a display device, to one or more speakers, or a combination thereof).

The method 400 further includes detecting an error associated with a second portion of the second media content item, at 412. The second portion of the second media content item is different than the first portion of the second media content item. In an illustrative example, detecting the error includes determining that the second portion is unavailable or that the second portion cannot be decoded. For example, the error detector 130 may detect an error associated with the second portion 142, such as by determining that the second portion 142 is missing from the buffer 324 or by detecting a decoding error associated with the second portion 142.

The method 400 further includes sending a request for the second portion of the second media content item via a second communications interface of the media device, at 416. For example, the media device 118 may send the request 138 to the content distributor 102 using the second communications interface 126 (e.g., a wired communications interface or a wireless communications interface), as described with reference to FIG. 1. As another example, the media device 118 may send the request 138 to the third device 204, as described with reference to FIG. 2.

In an illustrative example, the first media content item 106 is associated with a first channel that is specified by the user 160, and the second media content item is associated with a second channel that is indicated as a favorite channel of the user 160. The method 400 may optionally include receiving a channel change request at the media device, where the channel change request indicates the second channel. To illustrate, the media device 118 may receive the channel change request 162, and the channel change request 162 may indicate the second channel. The method 400 may further include outputting, in response to the channel change request, the first portion and the second portion of the second media content item (e.g., outputting the first portion 112 and the second portion 142) and receiving, while outputting the first portion and the second portion, additional portions of the first media content item and the second media content item via the first communications interface (e.g., by receiving the third portion 338 and the third portion 354, as illustrative examples).

The method 400 may improve media device operation. For example, the method 400 may enable the media device 118 to reduce or avoid a user-perceptible "lag" associated with requesting the second portion 142 of the second media content item 110.

Figure 5:
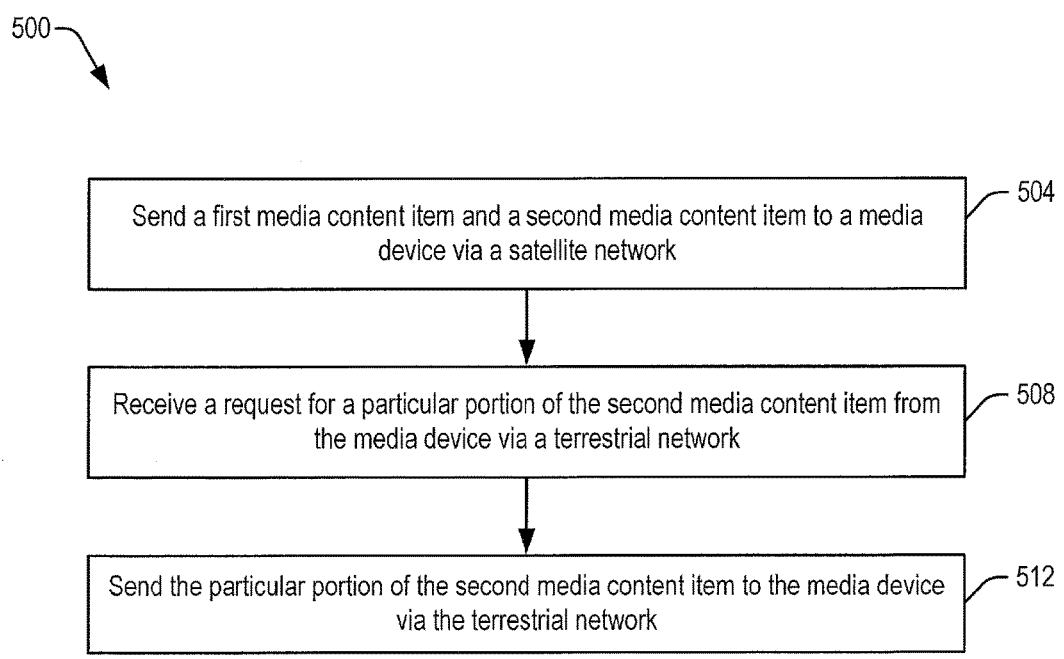
FIG. 5 is a flow diagram that illustrates a particular example of a method of operation of a content distributor, such as a content distributor included in the system of FIG. 1, the system of FIG. 2, or both.

Referring to FIG. 5, another particular illustrative example of a method is depicted and generally designated 500. The method 500 may be performed at a content distributor, such as the content distributor 102.

The method 500 may include sending a first media content item and a second media content item to a media device via a satellite network, at 504. For example, the content distributor 102 may send the first media content item 106 and the second media content item 110 to the media device 118 via the satellite network 114.

The method 500 may further include receiving a request for a particular portion of the second media content item from the media device via a terrestrial network, at 508. For example, the content distributor 102 may receive the request 138 for the second portion 142 of the second media content item 110 from the media device 118 via the terrestrial network 134.

The method 500 may further include sending the particular portion of the second media content item to the media device via the terrestrial network, at 512. For example, the content distributor 102 may send the second portion 142 of the second media content item 110 to the media device 118 via the terrestrial network 134.

The method 500 may enable improved media device operation. For example, the method 500 may enable the media device 118 to reduce or avoid a user-perceptible "lag" associated with requesting the second portion 142 of the second media content item 110.

Figure 6:
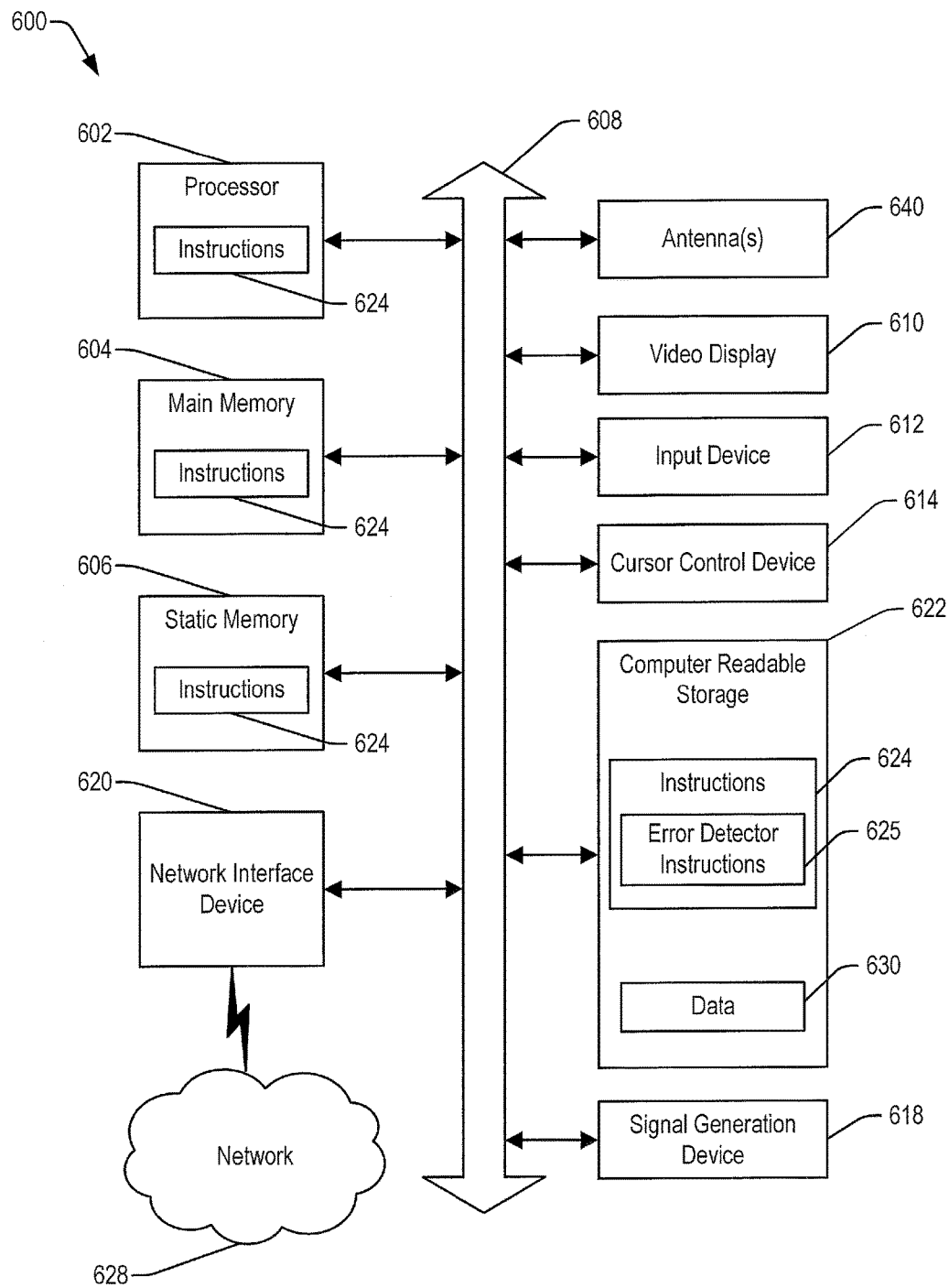
FIG. 6 is a block diagram of an illustrative example of a computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. One or more components of the computer system 600 may include or be included within one or more of the content distributor 102, the media device 118, or the third device 204.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. For example, if the computer system 600 corresponds to a media device, the processor 602 may include or correspond to a processor of the media device 118. As another example, if the computer system 600 corresponds to a network device (e.g., a server), the processor 602 may include or correspond to processor(s) of the content distributor 102.

Moreover, the computer system 600 may include a main memory 604 and a static memory 606, which can communicate with each other via a bus 608. For example, if the computer system 600 corresponds to a media device, the main memory 604 may include or correspond to a memory of the media device 118. As another example, if the computer system 600 corresponds to a server, the main memory 604 may include or correspond to a memory of the content distributor 102. As shown, the computer system 600 may further include a video display unit 610, such as a liquid crystal display (LCD), a light emitting diode (LED) display, a touch screen display, a flat panel display, or a solid state display. In an illustrative example, the video display unit 610 is coupled to the output interface 304 of FIG. 3 and is configured to display the first media content item 106, the second media content item 110, or both. Additionally, the computer system 600 may include an input device 612, such as a remote control device or a keyboard, and a cursor control device 614, such as a mouse. In some embodiments, the input device 612 and the cursor control device 614 may be integrated into a single device, such as a capacitive touch screen input device. The computer system 600 may also include a signal generation device 618, such as a speaker, and a network interface device 620. Some computer systems 600 may not include certain components depicted in FIG. 6, such as an input device (e.g., a server may not include an input device).

The computer system 600 may correspond to a mobile device that includes one or more antennae, such as an antenna 640. In other cases, the computer system 600 may be a wired device (e.g., a server) that does not include an antenna.

In a particular embodiment, as depicted in FIG. 6, the computer system 600 may include computer-readable storage 622 in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may embody one or more of the methods or logic as described herein.

As an illustrative example, the instructions 624 may include error detector instructions 625 corresponding to the error detector 130 of FIGS. 1-3. The error detector instructions 625 may be executable by the processor 602 to perform one or more functions or methods described herein, such as one or more of the operations of the method 400 of FIG. 4.

In a particular embodiment, the instructions 624 may reside completely, or at least partially, within the main memory 604, the static memory 606, and/or within the processor 602 during execution by the computer system 600. The main memory 604 and the processor 602 also may include a computer-readable storage device. FIG. 6 also illustrates that the computer-readable storage 622 may include data 630.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

Computer-readable storage 622 may store instructions 624 so that a device connected to a network 628 (e.g., the satellite network 114 or the terrestrial network 134) may communicate voice, video or data using the network 628. Although the computer-readable storage 622 is shown to be a single device, the computer-readable storage 622 may include a single device or multiple devices, such as a centralized or distributed database, and/or associated caches and servers that store one or more sets of instructions. The computer-readable storage 622 is capable of storing a set of instructions for execution by a processor to cause a computer system to perform any one or more of the methods or operations disclosed herein (e.g., one or more operations of the method 400 of FIG. 4, one or more operations of the method 500 of FIG. 5, or a combination thereof).

In a particular non-limiting, exemplary embodiment, the computer-readable storage 622 may include a solid-state memory such as embedded memory (or a memory card or other package that houses one or more non-volatile read-only memories). Further, the computer-readable storage 622 may be a random access memory or other volatile re-writable memory. Additionally, the computer-readable storage 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   concurrently receiving, at a first communication interface of a media device, a first media content stream and a second media content stream;
   sending, from the media device to an output device, decoded first media content processed from the first media content stream;
   storing, in a buffer, decoded second media content processed from first portions of the second media content stream, wherein the first portions of the second media content stream contain no detected errors;
   detecting a second portion of the second media content stream during receipt of the first media content stream and the second media content stream, wherein the second portion of the second media content stream contains a first detected error; and
   sending, from a second communication interface of the media device to a media content source, a request for first particular content, the first particular content corresponding to the second portion of the second media content stream and the second communication interface is distinct from the first communication interface.

2. The method of claim 1, further comprising:
   receiving the first particular content from the media content source; and
   storing the first particular content in the buffer.

3. The method of claim 1, further comprising storing, in the buffer, the decoded first media content processed from third portions of the first media content stream prior to sending the decoded first media content to the output device, wherein the third portions of the first media content stream contain no detected errors.

4. The method of claim 3, further comprising:
   detecting a fourth portion of the first media content stream, wherein the fourth portion contains a second detected error;
   sending, from the second communications interface to the media content source, a second request for second particular content, the second particular content corresponding to the fourth portion of the first media content stream;
   receiving the second particular content from the media content source; and
   storing the second particular content in the buffer.

5. The method of claim 1, wherein the second portion of the second media content stream corresponds to a missing portion of the second media content stream.

6. The method of claim 1, wherein the second portion of the second media content stream corresponds to a particular portion of the second media content stream that cannot be decoded.

7. The method of claim 1, wherein the first media content stream and the second media content stream are received from the media content source.

8. The method of claim 1, wherein the first media content stream and the second media content stream are received from a second media content source, the second media content source distinct from the media content source.

9. The method of claim 1, wherein the first communication interface comprises a satellite network interface, and wherein the second communication interface comprises a terrestrial network interface.

10. The method of claim 1, wherein the first media content stream is associated with a first channel, wherein the second media content stream is associated with a second channel, and further comprising:
    receiving a channel change request to change from the first channel to the second channel; and
    in response to the channel change request, sending the decoded second media content from the buffer to the output device.

11. An apparatus comprising:
    a first communication interface to concurrently receive a first media content stream and a second media content stream;
    an error detector to detect an error in a portion of the second media content stream while first media content processed from the first media content stream is sent to an output device; and
    a second communication interface to send a request for first particular content to a media content source responsive to detection of the error by the error detector, the first particular content corresponding to the portion of the second media content stream and the second communication interface is distinct from the first communication interface.

12. The apparatus of claim 11, wherein the error detector is configured to detect a second error associated with a second portion of the first media content stream, and wherein the second communication interface is configured to send a second request for second particular content corresponding to the second portion of the first media content stream to the media content source responsive to detection of the second error by the error detector.

13. The apparatus of claim 11, further comprising a buffer to store the first media content processed from the first media content stream and to store second media content processed from the second media content stream.

14. The apparatus of claim 13, further comprising a synchronizer to place the first particular content in the buffer at a chronologic location of the second media content.

15. The apparatus of claim 11, wherein the error detector determines the error responsive to the portion being absent or in response to not being able to decode the portion.

16. A computer-readable hardware storage device storing instructions executable by a processor to cause the processor to perform operations, the operations comprising:
    concurrently receiving, via a first communication interface, a first media content stream and a second media content stream;
    causing an output interface to send decoded first media content processed from the first media content stream to an output device;
    storing, in a buffer, decoded second media content processed from first portions of the second media content stream, wherein the first portions of the second media content stream contain no detected errors;
    detecting a second portion of the second media content stream during receipt of the first media content stream and the second media content stream, wherein the second portion of the second media content stream contains a first detected error; and causing a second communication interface to send a request for first particular content, the first particular content corresponding to the second portion of the second media content stream and the second communication interface is distinct from the first communication interface.

17. The computer-readable hardware storage device of claim 16, wherein the first media content stream is associated with a selected channel of a television distribution system, and wherein the second media content stream is associated with a second channel of the television distribution system.

18. The computer-readable hardware storage device of claim 17, wherein the second channel is designated as a favorite channel.

19. The computer-readable hardware storage device of claim 17, wherein the operations further comprise:
receiving a channel change request that indicates the second channel; and
responsive to the channel change request, causing the output interface to send the decoded second media content in the buffer to the output device.

20. The computer-readable hardware storage device of claim 16, wherein the output device comprises a speaker, a speaker system, a monitor, a television, or combinations thereof.

\* \* \* \* \*